(12) United States Patent
Vaney et al.

(10) Patent No.: US 11,801,910 B2
(45) Date of Patent: Oct. 31, 2023

(54) MOTORIZED SCOOTER WITH GEAR SYSTEM TRANSMISSION

(71) Applicant: ALLIGATOR INTERNATIONAL DESIGN SL, Barcelona (ES)

(72) Inventors: Laurent Julien Michel Vaney, Barcelone (ES); Genis Batlle Besora, Barcelone (ES)

(73) Assignee: ALLIGATOR INTERNATIONAL DESIGN SL, Barcelona (ES)

( * ) Notice: Subject to any disclaimer, the term of this patent is extended or adjusted under 35 U.S.C. 154(b) by 206 days.

(21) Appl. No.: 17/599,300

(22) PCT Filed: Mar. 24, 2020

(86) PCT No.: PCT/EP2020/058235
§ 371 (c)(1),
(2) Date: Sep. 28, 2021

(87) PCT Pub. No.: WO2020/193585
PCT Pub. Date: Oct. 1, 2020

(65) Prior Publication Data
US 2022/0169331 A1 Jun. 2, 2022

(30) Foreign Application Priority Data
Mar. 28, 2019 (FR) ........................ 1903266

(51) Int. Cl.
*B62K 15/00* (2006.01)
*B62K 3/00* (2006.01)
(Continued)

(52) U.S. Cl.
CPC ............ *B62K 15/006* (2013.01); *B62K 3/002* (2013.01); *B62K 21/02* (2013.01); *B62K 25/005* (2013.01); *B62M 11/02* (2013.01); *B62K 2204/00* (2013.01)

(58) Field of Classification Search
CPC .............................. B62K 15/006; B62K 3/002
See application file for complete search history.

(56) References Cited

U.S. PATENT DOCUMENTS 6,227,324 B1 * 5/2001 Sauve .................... B62D 61/02
180/181
6,345,678 B1 * 2/2002 Chang ................... B62K 3/002
180/181
(Continued)

FOREIGN PATENT DOCUMENTS

CN 2446036 Y 9/2001
CN 205469530 U 8/2016
(Continued)

OTHER PUBLICATIONS

International Search Report dated May 18, 2020 re: Application No. PCT/EP2020/058235, pp. 1-3, citing: U.S. Pat. No. 3345678 B1, JP S6092929 A, CN 205469530 U, WO 2011054178 A1, CN 2446036 Y, EP 0836985 A2 and DE 29612276 U1.

*Primary Examiner* — Katy M Ebner
(74) *Attorney, Agent, or Firm* — CANTOR COLBURN LLP

(57) ABSTRACT

A scooter includes a frame which has a footboard and supports a rear wheel, a steering column provided with a front wheel pivotably mounted on the frame, and a motor provided with a drive shaft coupled to the rear wheel via a transmission system. The transmission system includes a rear transverse shaft having a first end portion and a second end portion rotatably coupled to the rear wheel; —a gear system having a sprocket coupled rotatably to the first end portion and in meshing engagement with a toothed gear rotatably coupled to the drive shaft; and —a rear structure attached to the frame, supporting the gear system and the rear transverse shaft, and extending laterally along one side only—right or left—of the rear wheel, such that the second
(Continued)

end portion extends from the rear structure to support the rear wheel in a cantilevered fashion.

15 Claims, 5 Drawing Sheets

(51) Int. Cl.
  *B62K 21/02* (2006.01)
  *B62K 25/00* (2006.01)
  *B62M 11/02* (2006.01)

(56) References Cited

U.S. PATENT DOCUMENTS

| | | | | |
|---|---|---|---|---|
| 7,040,443 | B1* | 5/2006 | Roth | B62K 3/002 |
| | | | | 180/68.5 |
| 8,061,725 | B1* | 11/2011 | Hawkins | A63C 17/12 |
| | | | | 180/181 |
| 8,801,009 | B2* | 8/2014 | Sapir | B62K 3/002 |
| | | | | 280/87.05 |
| 9,302,173 | B2* | 4/2016 | DiCarlo | A63C 17/12 |
| 10,377,403 | B2* | 8/2019 | Lee | B60K 17/043 |
| 10,850,783 | B2* | 12/2020 | Cordero | B62K 25/20 |
| 2006/0207814 | A1* | 9/2006 | Tseng | B60K 7/0007 |
| | | | | 180/65.51 |
| 2011/0120786 | A1* | 5/2011 | Lin | B62K 3/002 |
| | | | | 180/62 |
| 2019/0118647 | A1* | 4/2019 | Jessie, Jr. | B62K 9/02 |
| 2019/0143232 | A1* | 5/2019 | Lovley, II | A63H 17/262 |
| | | | | 446/465 |
| 2019/0263468 | A1* | 8/2019 | Huang | B62J 43/13 |
| 2019/0367116 | A1* | 12/2019 | Desberg | B62J 43/10 |
| 2021/0379987 | A1* | 12/2021 | Huang | F16H 1/36 |

FOREIGN PATENT DOCUMENTS

| | | |
|---|---|---|
| DE | 29612276 U1 | 9/1996 |
| EP | 0836985 A2 | 4/1998 |
| JP | S6092929 A | 5/1985 |
| WO | 2011054178 A1 | 5/2011 |

\* cited by examiner

[Fig.1]
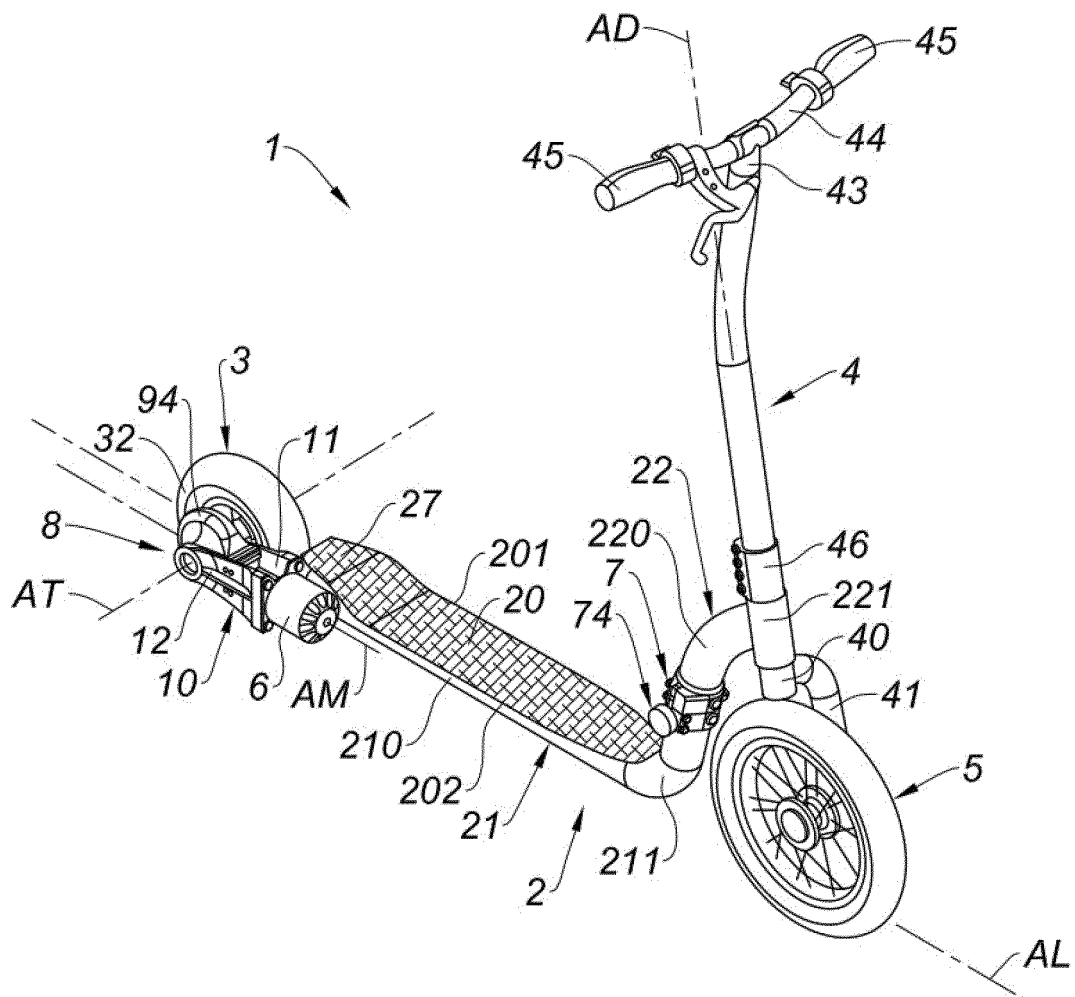
[Fig.2]
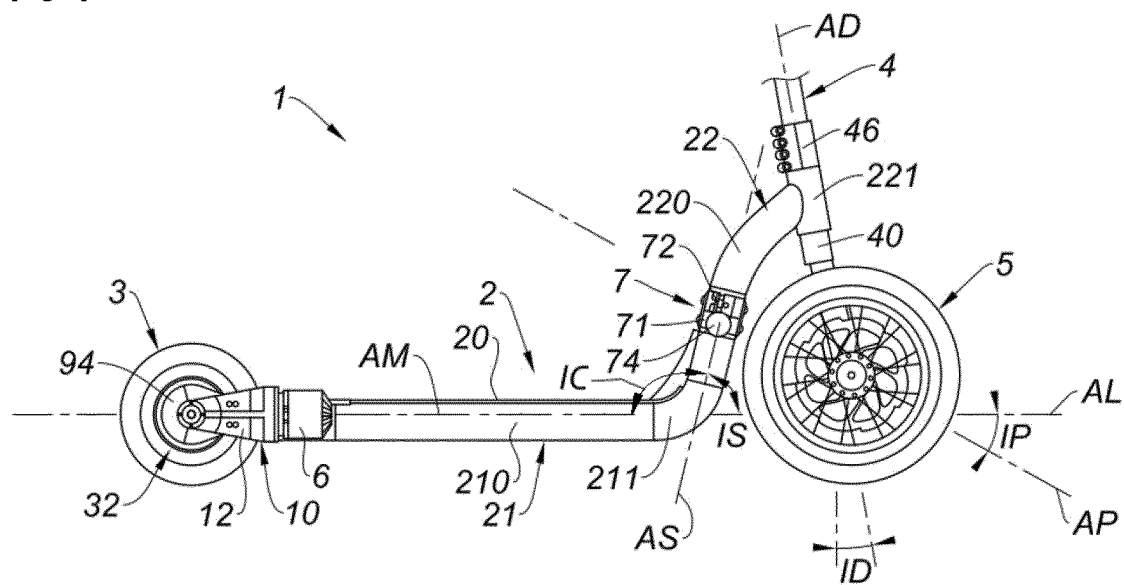

[Fig.3]
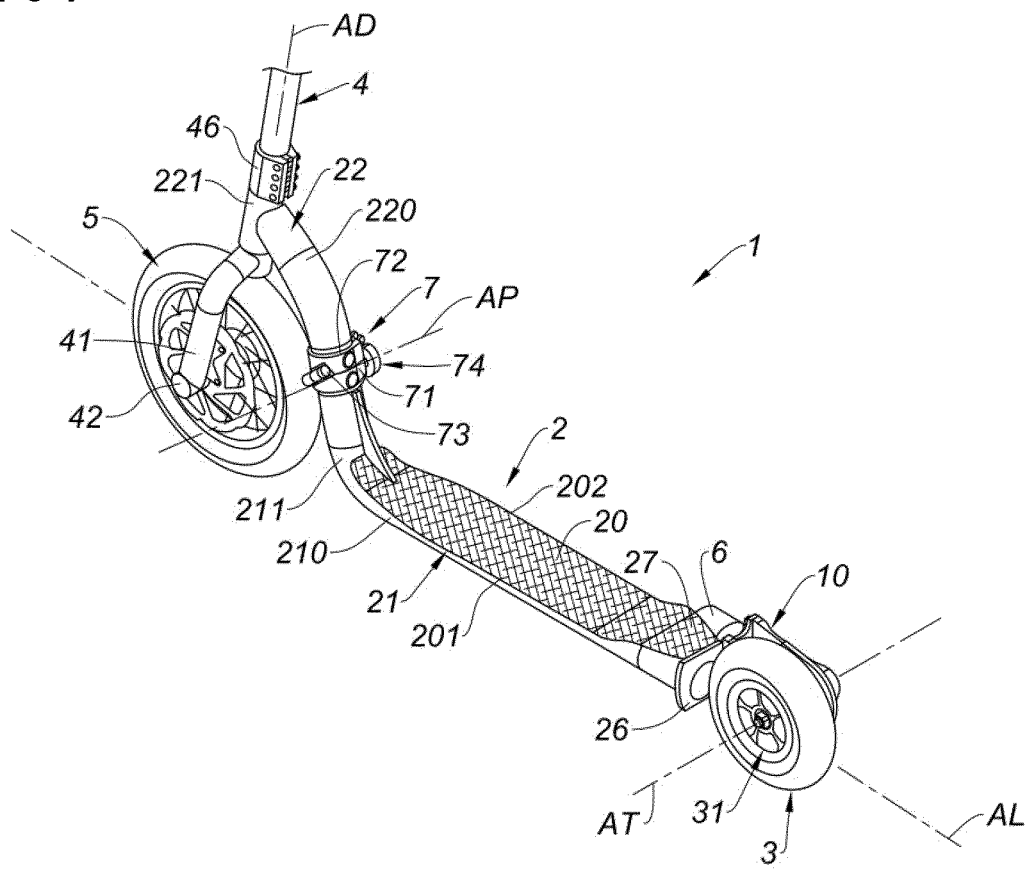
[Fig.4]
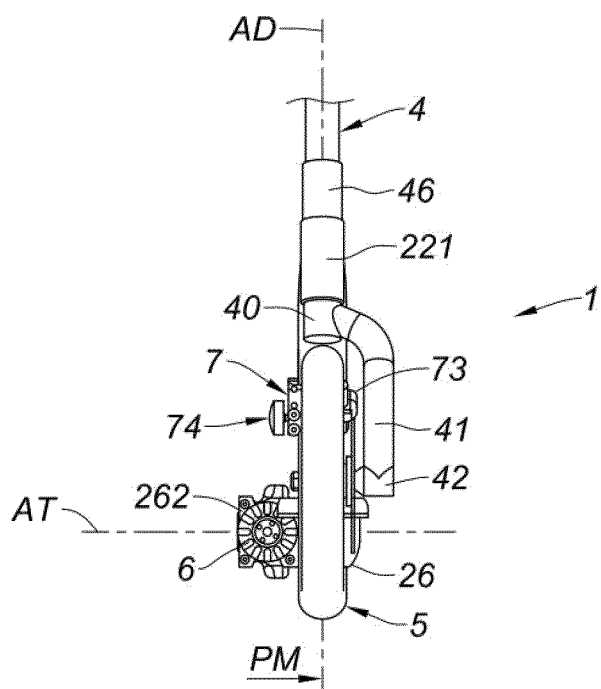

[Fig.5]
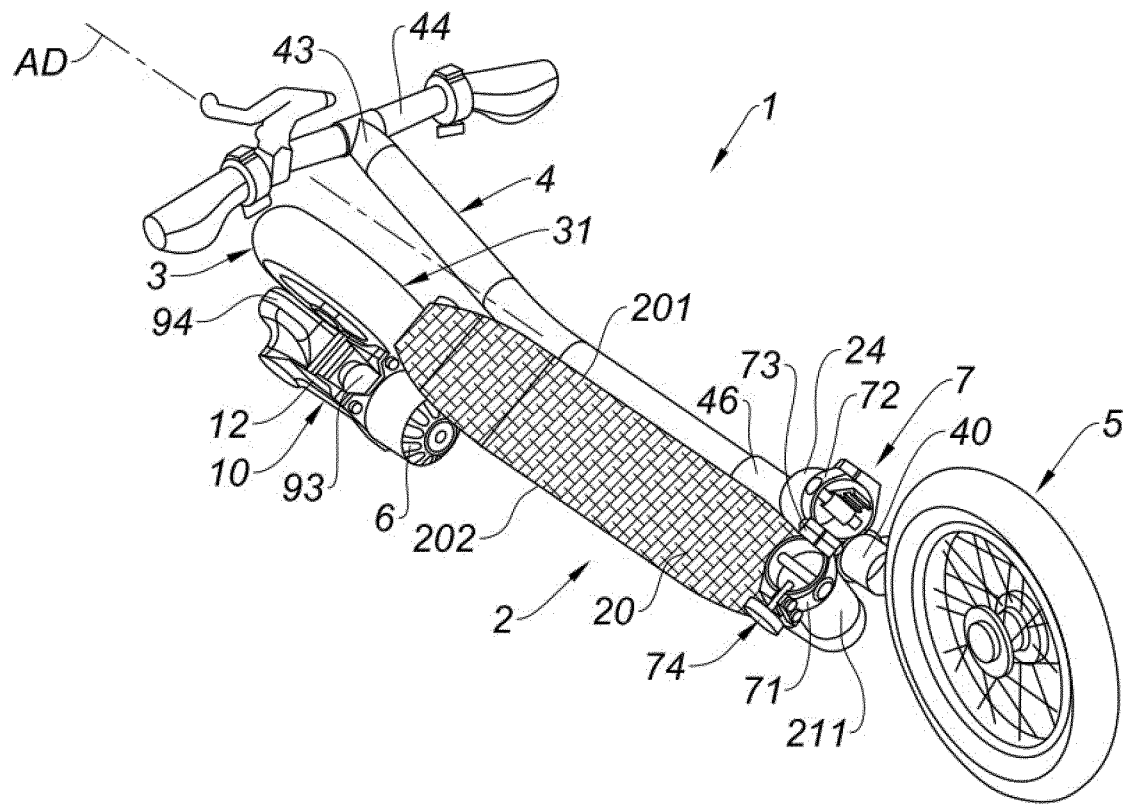
[Fig.6]
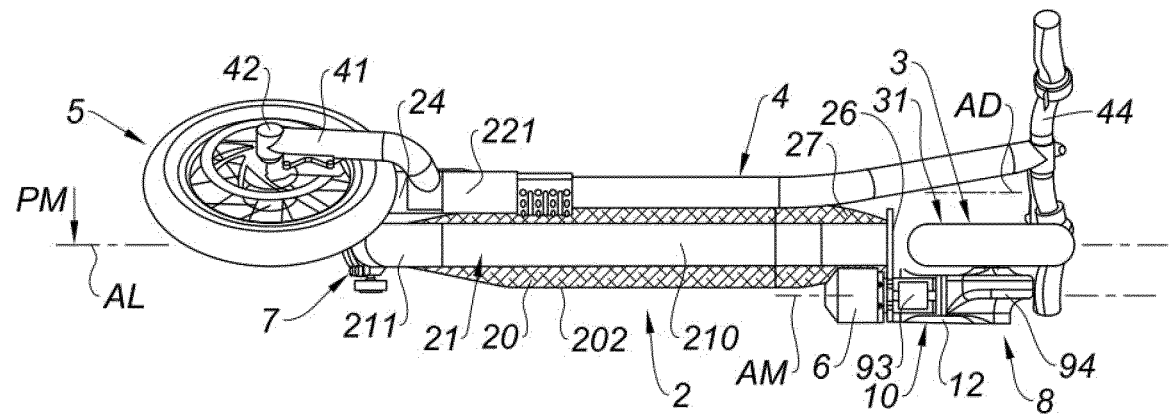

[Fig.7]
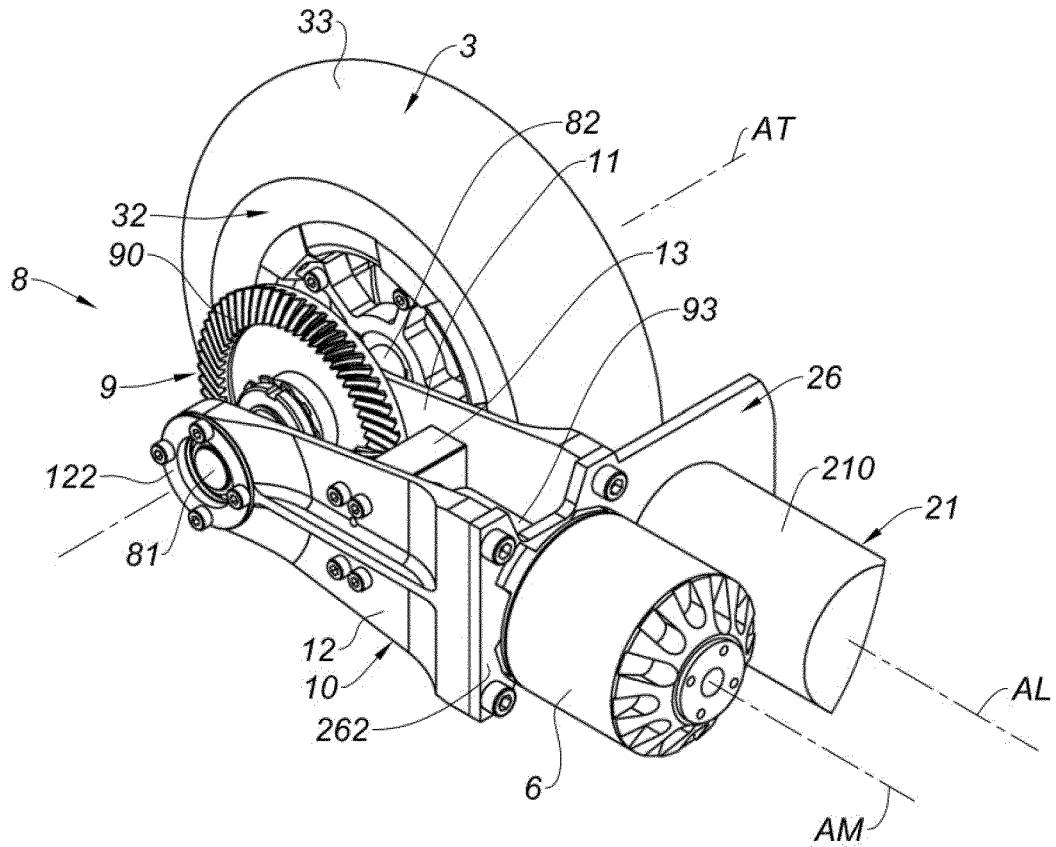
[Fig.8]
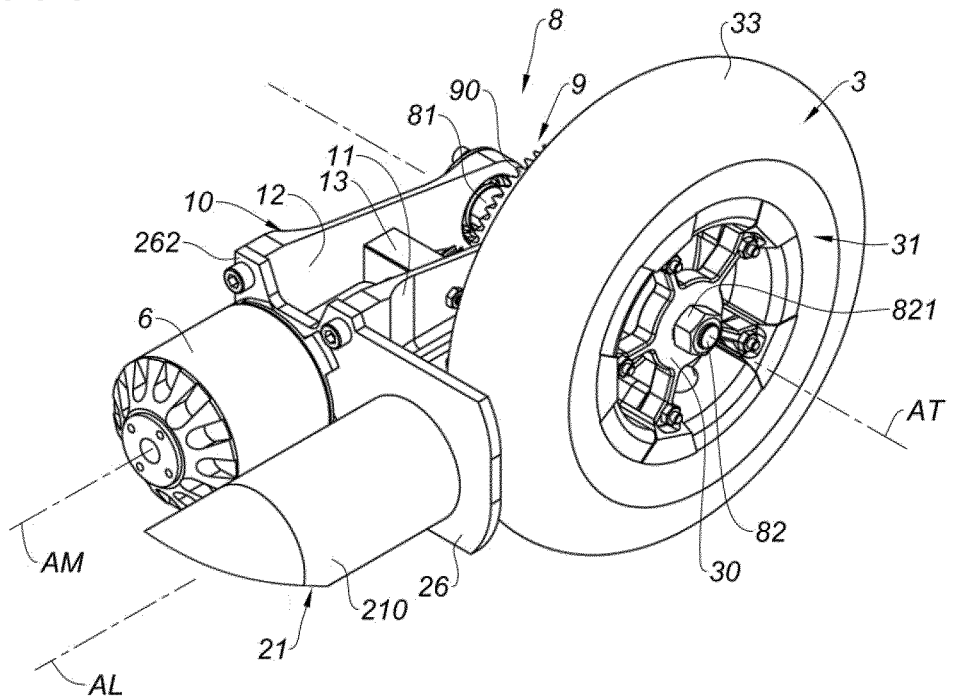

[Fig.9]
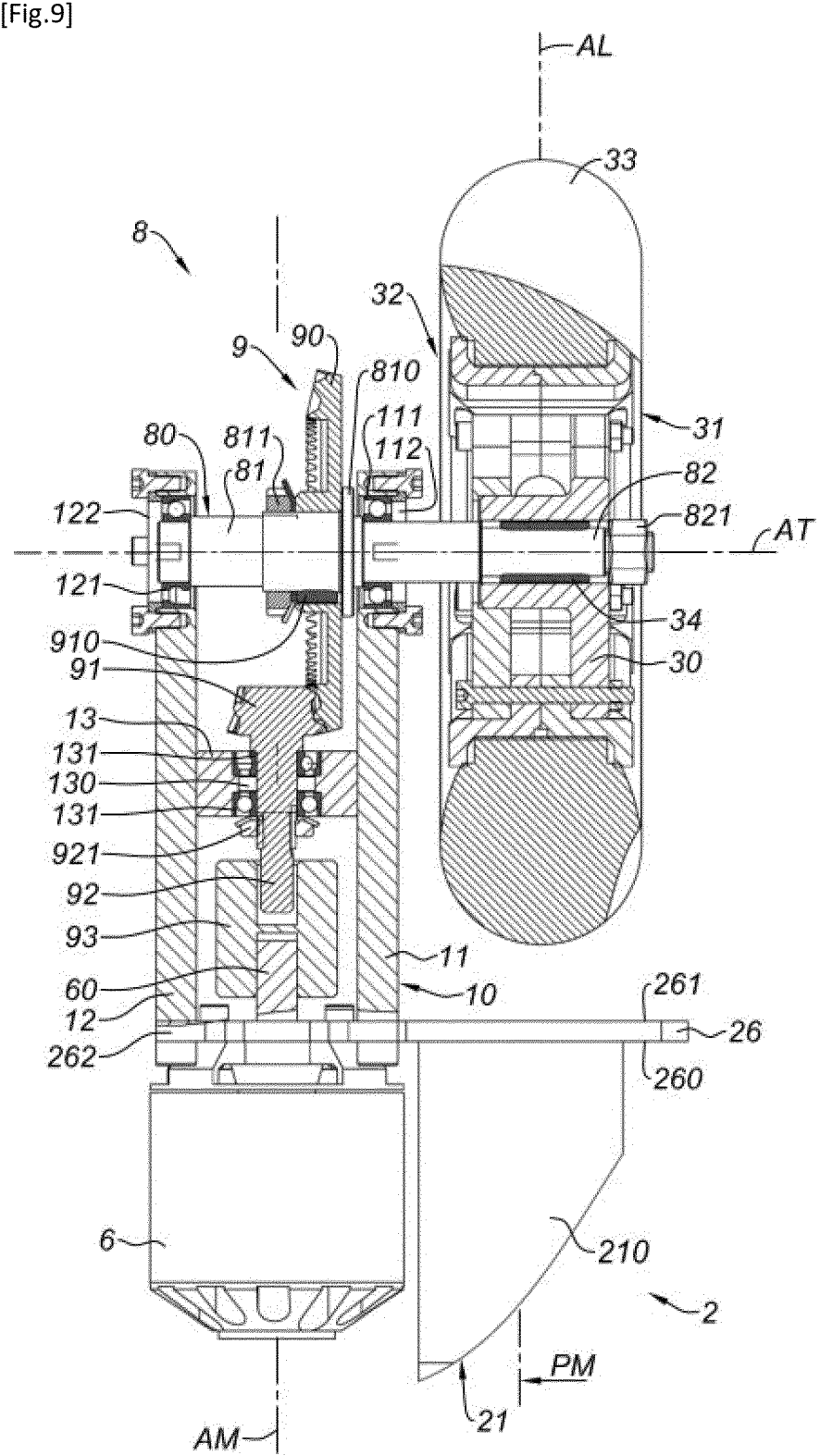

MOTORIZED SCOOTER WITH GEAR SYSTEM TRANSMISSION

TECHNICAL FIELD

The disclosure relates to a scooter, and more specifically to a motorized scooter comprising a frame provided with a footboard and supporting a rear wheel, a steering column equipped with a front wheel and pivotally mounted on the frame, and a motor coupled to the rear wheel to drive it in rotation.

The disclosure finds a favorite, and non-limiting, application for an electric scooter, that is to say a motorized scooter with an electric motor.

BACKGROUND

In a first known embodiment, the motor is directly integrated inside the rear wheel, in its hub. In this first embodiment, the specific size of the rear wheel and the necessary torque require, in the absence of a necessarily bulky torque reducer, integrating either a large-sized motor and therefore too heavy for the larger wheels, or wheels that are too small, unstable and hard.

Moreover, the fact of integrating the motor into the wheel makes it essential to use a solid rim with complex assemblies to guarantee tightness thereof, and a rear fork that is complex to remove to support the driving wheel, contributes to increase the weight and inertia of the driving wheel, and increase difficulty during repairs (in particular when changing a wheel or changing an inner tube or tire) and accessing various points of the wheel and the motor.

In a second known embodiment, the motor is equipped with a motor shaft which drives in rotation the rear wheel via a chain or belt transmission. The chain or belt is thus directly connected to the rear wheel and left out in the open air.

However, the specific size of the rear wheel rarely allows for an optimum transmission ratio. Moreover, in the particular case of a scooter, the proximity to the ground and the difficulty of protecting the chain or the belt from external aggressions weakens this type of transmission and makes its maintenance difficult.

The state of the art may also be illustrated by the teaching of the document JP S60 92929 A which discloses a motorcycle comprising a frame provided with a footboard and supporting a saddle for the driver to seat on, and a motor carried by the frame and equipped with a casing and a motor shaft, wherein this motor shaft is coupled to a rear transverse shaft carrying the rear wheel via a gear system. This gear system comprises a gear pinion coupled via a reducer to the motor shaft, and a gear ring mounted on the rear transverse shaft. However, in this motorcycle, it is planned to partially mount the rear transverse shaft, as well as the gear ring and the gear pinion, inside a closed case which is fastened on both a casing, a hub of the rear wheel and also fastened to the frame via a suspension member. Such a structure formed by this case is however unsuitable for a scooter, in particular because of the suspension member, and also has drawbacks from a mechanical point of view (limited mechanical support for the rear transverse shaft and for the gear system) and from an accessibility point of view (complicated access to the rear wheel, in particular for a repair or a tire change).

SUMMARY

The present disclosure aims at solving all or part of the aforementioned drawbacks, by proposing a motorized scooter provided with a transmission system which contributes to a reduction in weight and bulk.

The disclosure facilitates maintenance operations on the rear wheel and on the motor, in particular a wheel replacement or a repair of an inner tube in the rear wheel.

The disclosure reduces the bulk around the rear wheel, and in particular the lateral bulk on a right or left side of the rear wheel.

The disclosure also adapts the speed and torque conditions provided by the motor in a single gear reduction step.

To this end, the disclosure provides a scooter comprising a frame provided with a footboard and supporting a rear wheel, a steering column equipped with a front wheel and pivotally mounted on this frame, and a motor equipped with a motor shaft driven in rotation about a motor axis and coupled to the rear wheel to drive it in rotation about a transverse axis via a transmission system, the scooter having a midplane orthogonal to the transverse axis and delimiting opposite first and second lateral sides, and the rear wheel having a first lateral face on the first lateral side and a second lateral face, opposite to the first lateral face, on the second lateral side, this scooter being remarkable in that the transmission system comprises:

a rear transverse shaft extending along the transverse axis, not parallel to the motor axis, and having two opposite end portions, respectively a first end portion and a second end portion, the rear wheel being coupled in rotation on the second end portion of the rear transverse shaft;

a gear system comprising a gear ring meshing with a gear pinion, said gear ring being coupled in rotation on the first end portion of the rear transverse shaft, and said gear pinion being coupled in rotation to the motor shaft, such that a rotation of the motor shaft is convertible by said gear system into a rotation of the rear transverse shaft and the rear wheel about the transverse axis; and a rear structure fastened to the frame and supporting at least the gear pinion and the first end portion of the rear transverse shaft, said rear structure extending laterally on the second lateral side with respect to the midplane, facing the second lateral face of the rear wheel, such that the second end portion of the rear transverse shaft protrudes from the rear structure to support in a cantilever fashion the rear wheel.

Thus, the disclosure suggests using a gear system making it possible to adapt the speed and torque conditions provided by the motor in a single gear reduction step, and therefore also making it possible to dispense with components whose maintenance cost is high like chains and belts.

Moreover, the disclosure makes it possible to completely clear the first lateral face of the rear wheel, opposite to the second lateral face and to the rear structure, which allows free access to the rear wheel on the first lateral side (right or left), in particular to extract it easily and quickly in order to facilitate maintenance and repair tasks in a daily environment.

Such a gear system also makes it possible to have a torque transmission ratio ranging up to 1:5, which is particularly advantageous for a scooter, ultimately offering a light and simple transmission, suitable for this type of vehicle.

The cantilever mounting of the rear wheel allows the use of a good-quality rear wheel, easily removable, possibly with a tire and an inner tube that gives the scooter the convenience and safety required in circulation.

In the context of the disclosure, a lateral side is to be assessed with respect to the midplane of the scooter which is orthogonal to the transverse axis and which includes a longitudinal axis of the scooter; such a longitudinal axis passing through the front wheel and through the rear wheel and being parallel to an advance direction of the scooter when the latter moves forward in a straight line. This midplane also includes a vertical axis considering that the scooter is resting on a horizontal ground.

Thus, the first lateral side corresponds to a right side (or conversely a left side) whereas the second lateral side corresponds to a left side (or conversely a right side). An arrangement on the right side of an element (such as the rear wheel) corresponds to an arrangement to the right of the midplane facing a right lateral face (or a right edge) of the element, and an arrangement on the left side of an element corresponds to an arrangement to the left of the midplane facing a left lateral face (or a left edge) of the element.

These relative arrangements on the right or left lateral sides are to be distinguished from an arrangement on the top which corresponds to a vertical rise (and therefore to a distance from the ground), an arrangement on the bottom which corresponds to a vertical lowering (and therefore an approach to the ground), an arrangement on the front (or forefront) which corresponds to a relative position along the longitudinal axis in the direction of approach with respect to the front wheel, and an arrangement on the rear (or the backside) which corresponds to a relative position along the longitudinal axis in the direction of approach with respect to the rear wheel.

Moreover, and according to the disclosure, the rear structure comprises two flanges, respectively an inner flange and an outer flange, extending facing each other and spaced from each other, the inner flange extending at least partially opposite the second lateral face of the rear wheel, these flanges surrounding the gear pinion and the gear ring, and wherein the first end portion of the rear transverse shaft passes through rear orifices formed facing each other in the respective flanges.

Thus, the rear transverse shaft is carried by these two flanges which protect and support the transmission system and in particular its gear system.

Such a rear structure with these two flanges has the advantages of being compact, and therefore suitable for a scooter which has its motor close to the ground, while providing support for the rear transverse shaft which is effective to support in a cantilever fashion the rear wheel.

According to one possibility, the rear orifices of the flanges support rolling bearings in which is rotatably mounted the first end portion of the rear transverse shaft.

Such rolling bearings may for example be of the ball bearing, needle bearing, bearing roller, cylindrical roller, plain bearing or sliding bearing type.

According to another possibility, the rear structure comprises a plate provided with a front orifice through which passes a pinion shaft secured to the gear pinion.

Thus, the gear pinion and the pinion shaft are carried by the rear structure and in particular by this plate.

Advantageously, the front orifice of the plate supports at least one rolling bearing in which is rotatably mounted the pinion shaft.

This rolling bearing may for example be of the ball bearing, needle bearing, bearing roller, cylindrical roller, plain bearing or sliding bearing type.

In a particular embodiment, the plate extends between the two flanges.

Thus, the rear structure has an "H"-like structure with the two facing flanges and the plate joining the two flanges together and carrying the pinion shaft.

In a particular embodiment, the gear pinion is coupled to the motor shaft via an elastomer coupling, a constant velocity joint, a transmission joint or a universal joint, or alternatively via a preliminary gear system.

Such an elastomeric coupling forms a coupling which is both torsionally rigid to transmit rotational torque between the motor shaft and the gear pinion, while allowing compensation for angular, axial and parallel misalignments between the motor axis and the pinion axis.

The aforementioned joints also enable a transmission of a torque in rotation and a correction of misalignment between the motor axis and the pinion axis. The preliminary gear system also allows achieving a torque transmission function.

It should be noted that the elastomer coupling further allows the motor to be coupled and uncoupled simply, by separating the motor shaft from the gear pinion to which it is attached by means of the elastomer coupling.

According to one possibility, the motor axis is orthogonal to the transverse axis or is inclined with respect to the transverse axis by an angle comprised between 45 and 90 degrees.

According to another possibility, the motor axis is parallel to a longitudinal axis of the scooter, such a longitudinal axis being included in the midplane and passing through the front wheel and through the rear wheel while being parallel to an advance direction of the scooter when it moves forward in a straight line, or is inclined with respect to the longitudinal axis by an angle comprised between 0 and 45 degrees.

In an advantageous embodiment, the rear wheel is provided with a hub which is coupled in rotation on the second end portion of the rear transverse shaft, for example by means of at least a key, a flange coupling, a pin coupling, a yoke coupling or a ring coupling.

According to another possibility, the gear system forms a bevel gear with helical or spur toothing.

According to one feature, the gear system has a transmission ratio between the motor shaft at the input and the rear transverse shaft at the output which is comprised between 1:2 and 1:5.

According to another feature, the rear structure is fastened to a connecting plate secured to the frame, said connecting plate supporting the motor and having two opposite faces, respectively a front face from which protrudes the motor and a rear face from which protrudes the rear structure.

In a particular embodiment, the motor extends behind the footboard and partially below the footboard, on the right or left side.

According to one possibility, the footboard has a rear step, raised, for an arrangement of the motor partially below this rear step.

The disclosure also relates to the feature according to which the scooter is foldable with its frame comprising, on the one hand, a first portion supporting the rear wheel and the footboard and, on the other hand, a second portion pivotally supporting the steering column, wherein the first portion and the second portion of the frame are connected to each other by a swivel joint according to a folding axis allowing mobility of one relative to the other between:

an unfolded configuration in which the steering column projects upwardly with respect to the footboard for use when moving, said steering column extending in the midplane; and a folded configuration in which the steering column is folded down onto the first lateral side with respect to the midplane and extends away from said midplane, at least partially below the footboard, along a first lateral rim of the footboard located on said first lateral side and facing the first lateral face of the rear wheel.

Thus, the first lateral face of the rear wheel being cleared thanks to the cantilever mounting of the rear wheel, it is advantageous to bring the steering column, during folding, as close as possible to this first lateral face, which provides a reduced lateral bulk.

BRIEF DESCRIPTION OF THE DRAWINGS

Other features and advantages of the present disclosure will become apparent upon reading the detailed description below, of a non-limiting example of implementation, made with reference to the appended figures in which:

FIG. 1 is a schematic front perspective view of a scooter 1, according to an embodiment of the disclosure, in the unfolded configuration;

FIG. 2 is a schematic side view, in this case the right side, of the scooter of FIG. 1 (not fully represented);

FIG. 3 is a schematic rear perspective view of the scooter of FIGS. 1 and 2 (not fully represented);

FIG. 4 is a schematic view, a schematic front view of the scooter of FIGS. 1 to 3 (not fully represented);

FIG. 5 is a schematic front perspective view of the scooter of FIGS. 1 to 4, in the folded configuration;

FIG. 6 is a schematic bottom view of the scooter of FIGS. 1 to 5, in the folded configuration;

FIG. 7 is a schematic perspective view of the right side of the backside of the scooter of FIGS. 1 to 6, without the footboard or the rear casing to display the transmission system and its gear system;

FIG. 8 is a schematic perspective view of the left side of the backside of the scooter of FIGS. 1 to 6, without the footboard or the rear casing; and FIG. 9 is a schematic sectional view of the backside of the scooter of FIGS. 1 to 6 in a horizontal section plane containing the motor axis and the transverse axis

DETAILED DESCRIPTION OF THE DRAWINGS

Referring to FIGS. 1 to 6, a scooter 1, according to an embodiment of the disclosure, forms a motorized scooter and more specifically an electric scooter or electrically powered scooter. The scooter 1 is a two-wheeled scooter, comprising:
a frame 2 provided with a footboard 20 and supporting a rear wheel 3 rotating about a transverse axis AT,
a steering column 4 equipped with a front wheel 5, this steering column 4 being pivotally mounted on the frame 2; and
a motor 6 coupled to the rear wheel 3 via a transmission system 8 to drive it in rotation about the transverse axis AT, the rear wheel 3 thus forming the drive wheel adapted to propel the scooter 1.

The scooter 1 has a midplane PM orthogonal to the transverse axis AT and delimiting two opposite lateral sides, right and left, namely a first lateral side (later in the description this will be the left side) and a second lateral side (later in the description this will be the right side). This midplane PM also includes a longitudinal axis AL of the scooter 1, such a longitudinal axis AL passing through the front wheel 5 and through the rear wheel 3 while being parallel to an advance direction of the scooter 1 when the latter moves forward in a straight line. This longitudinal axis AL is thus orthogonal to the transverse axis AT. The midplane PM forms a plane of symmetry for the footboard 20 and the two wheels 3, 5.

The frame 2 comprises a tubular structure which may, without this being restrictive, be made of metallic material, and this frame 2 has two portions 21, 22, respectively:
a first portion 21 which supports the rear wheel 3 and the footboard 20; and
a second portion 22, in the continuation of the first portion 21, and which pivotally supports the steering column 4.

The remainder of the description relates to the motorization of the scooter 1.

The motor 6 is fixedly mounted, for example by bolting, on a plate 26 secured to the frame 2, and more specifically a plate 26 which is secured to a rear end of the first portion 21 of the frame 2.

This plate 26 extends in a vertical plane, orthogonally to the longitudinal axis AL of the scooter 1. This plate 26 has two opposite faces 260, 261, namely:
a front face 260 oriented forwards (front wheel side 5) and from which protrudes the motor 6; and
a rear face 261 oriented rearwards (rear wheel side 3).

This plate 26 is asymmetrical with respect to the midplane PM of the scooter 1 by having a lateral portion 262 that projects laterally on the second lateral side (to recall the right side in the Figures) with respect to the midplane PM. This lateral portion 262 therefore protrudes over the second lateral side, beyond the frame 2 and even beyond the footboard 20, while being located below this same footboard 20.

Also, the motor 6 is fastened on this lateral portion 262 and thus this motor 6 extends on the second lateral side, next to the rear end of the first portion 21 of the frame 2. The motor 6 therefore extends to the rear of the footboard 20, and partially below the footboard 20, partially projecting laterally to the right of the footboard 20.

As shown in FIGS. 1, 2, 3 and 5, the footboard 20 has a rear step 27, raised, for an arrangement of the motor 6 partially below this rear step 27.

The motor 6 is equipped with a motor shaft 60 driven in rotation about a motor axis AM parallel to the longitudinal axis AL, where this motor shaft 60 passes through the plate 26 to protrude beyond the rear face 261 of the plate 26.

As regards the transmission between the motor shaft 60 and the rear wheel 3, the transmission system 8 comprises a gear system 9 forming a bevel gear with helical or spur toothing provided with a gear ring 90 meshing with a gear pinion 91.

The gear pinion 91 is secured to a pinion shaft 92 extending coaxially and in the continuation of the motor shaft 60, and this pinion shaft 92 is coupled in rotation to the motor shaft 60 via an elastomer coupling 93. Thus, the rotation of the motor shaft 60 causes the rotation of the pinion shaft 92 and therefore of the gear pinion 91 about the motor axis AM parallel to the longitudinal axis AL.

Instead of the elastomer coupling 93, it may be conceivable to provide other transmission means between the pinion shaft 92 and the motor shaft 60, such as for example a constant velocity joint, a transmission joint or a universal joint, such joints making it possible, like the elastomer coupling 93, to make up for any misalignment between the pinion shaft 92 and the motor shaft 60. Alternatively, a preliminary gear system may be provided (in addition of the aforementioned gear system) to couple in rotation the pinion shaft 92 and the motor shaft 60.

The transmission system 8 further comprises a rear transverse shaft 80 extending along the transverse axis AT orthogonal to the motor axis AM. This rear transverse shaft 80 has two opposite end portions 81, 82, namely:

a first end portion 81 coupled in rotation to the gear ring 91, this gear ring 91 thus being carried by this first end portion 81;

a second end portion 82 coupled in rotation to the rear wheel 3, this rear wheel 3 thus being carried by this second end portion 82.

Thus, a rotation of the motor shaft 60 about the motor axis AM may be converted by this gear system 9 into a rotation of the rear transverse shaft 80 and of the rear wheel 3 around the transverse axis AT. Moreover, this gear system 9 has a transmission ratio between the motor shaft 60 at the input and the rear transverse shaft 80 at the output, which is fixed and comprised between 1:2 and 1:5.

The transmission system 8 further comprises a rear structure 10 fastened to the frame 2 and supporting the gear system 9, the rear transverse shaft 80 and the rear wheel 3.

It should also be noted that the rear wheel 3 has two opposite side faces 31, 32, namely:

a first lateral face 31 on the first lateral side (to recall the left side in the Figures) with respect to the midplane PM, and a second lateral face 32 on the second lateral side (to recall the right side in the Figures) with respect to the midplane PM.

These side faces 31, 32 form the edges to the right and to the left of the rear wheel 31, which border a circumferential tread 33.

This rear structure 10 extends laterally only on the second lateral side with respect to the midplane PM, just like the motor 6 and the lateral portion 262 of the connecting plate 26 which also extend on this second lateral side. This rear structure 10 extends partially facing the second side face 32 of the rear wheel 3.

This rear structure 10 is fastened to the connecting plate 26, and more specifically to the lateral portion 262, and protrudes from its rear face 261. Thus, the motor 6 and the rear structure 10 extend on either side of this connecting plate 26. This rear structure 10 is for example fastened by bolting, screwing or welding on the connecting plate 26, just as it is conceivable that this rear structure 10 is integral with the connecting plate 26.

This rear structure 10 comprises two flanges 11, 12, respectively an inner flange 11 and an outer flange 12, extending facing each other and spaced apart from one another. The inner flange 11 extends on the inside along the rear wheel 3 and opposite the second side face 32 of the rear wheel 3, while the outer flange 12 extends on the outside, at a longer distance from the second lateral face 32 of the rear wheel 3 compared to the inner flange 11.

These two flanges 11, 12 extend parallel to the motor axis AM and are orthogonal to the transverse axis AT. These two flanges 11, 12 extend from the rear face 261 of the connecting plate 26, on which they are fastened.

This rear structure 10 also comprises a plate 13 extending between the two flanges 11, 12. This plate 13 extends orthogonally to the motor axis AM and is located at a distance from the connecting plate 26. Thus, this rear structure 10 has an "H"-type structure with the two parallel flanges 11, 12 and the plate 13 joining the two flanges 11, 12 between them. This plate 13 is fastened to the two flanges 11, 12 for example by screwing, bolting or welding, just as it is conceivable that this plate 13 is integral with the two flanges 11, 12.

This plate 13 is provided with an orifice, called the front orifice 130, crossed by the pinion shaft 92 secured to the gear pinion 91. This front orifice 130 supports at least one rolling bearing 131, and in particular two rolling bearings 131 as shown in FIG. 9, in which the pinion shaft 92 is rotatably mounted. Thus, the pinion shaft 92 is carried by this plate 13 and is guided in rotation in its front orifice 130. This or each rolling bearing 131 may for example be a ball or needle bearing.

The pinion shaft 92 is in a pivot connection with the plate 13, and to do this the pinion shaft 92 is blocked in translation along the motor axis AM, by means of:

a shoulder provided on the pinion shaft 92 on the side of the gear pinion 91, such a shoulder abutting against a front face of the plate 13; and a nut 921 screwed onto a threaded section of the pinion shaft 92 and abutting against a rear face of the plate 13.

The elastomer coupling 93 is located between the plate 13 and the connecting plate 26, and extends between the two flanges 11, 12.

The two flanges 11, 12 have respective orifices, called rear orifices, which are formed facing each other and which are both crossed by the first end portion 81 of the rear transverse shaft 80. These two rear orifices support respective rolling bearings 111, 121 in which the first end portion 81 of the rear transverse shaft 80 is rotatably mounted. Thus, the rear transverse shaft 80 is carried by these two flanges 11, 12 and is guided in rotation in their rear orifices. The rolling bearings 111, 121 may for example be ball or needle bearings.

The two flanges 11, 12 surround the gear pinion 91 and the gear ring 90, and the first end portion 81 of the rear transverse shaft 80 extends mainly between the two flanges 11, 12 of the rear structure 10, whereas the second end portion 82 of the rear transverse shaft 80 protrudes from the rear structure 10, and more specifically protrudes from the inner flange 11 to support in cantilever fashion the rear wheel 3.

The gear ring 91 is secured in rotation to the rear transverse shaft 80 by means of a key 910 coupling the gear ring 91 to the first end portion 81 of the rear transverse shaft 80. The gear ring 91 is blocked in translation along the transverse axis AT, by means of:

a shoulder 810 provided on the first end portion 81 on the side of the inner flange 11, the gear ring 91 offering an inner face bearing against such a shoulder 810; and a nut 811 screwed onto a threaded section of the first end portion 81 and abutting against an outer face of the gear ring 91.

The rear transverse shaft 80 is in a pivot connection with the flanges 11, 12, and to do this the rear transverse shaft 80 is blocked in translation along the transverse axis AT, by means of:

an outer shoulder provided on the first end portion 81 and on which abuts the rolling bearing 121 mounted in the outer flange 12, and a blocking collar 122 fastened on the outer flange 12 and blocking this same rolling bearing 121; and an inner shoulder provided on the first end portion 81 and on which abuts the rolling bearing 111 mounted in the inner flange 11, and a blocking collar 112 fastened on the inner flange 11 and blocking this same rolling bearing 111.

The rear wheel 3 extends at a fixed distance with respect to the inner flange 11 of the rear structure 10, and this rear wheel 3 is carried in a cantilever fashion by the second end portion 82 of the rear transverse shaft 80. It should be noted that the second lateral face 32 of the rear wheel 3 is covered by the rear structure 10 and by the gear system 9, whereas the first lateral face 31 of the rear wheel 3 is completely clear and access-free, thanks to this cantilever mounting.

The rear wheel 3 has a hub 30 which is crossed by the second end portion 82 and which is secured in rotation with this second end portion 82 of the rear transverse shaft 80 by means of at least one key 34 coupling the hub 30 to the second end portion 82 of the rear transverse shaft 80.

Instead of the keyed coupling between the rear transverse shaft 80 and the hub 30 of the rear wheel 3, it may be conceivable to provide other rotational coupling means, such as for example a flange coupling, a pin coupling, a yoke coupling, a ring coupling, . . . .

The hub 30 is in a pivot connection with the second end portion 82 of the rear transverse shaft 80, and to do this the second end portion 82 is blocked in translation along the transverse axis AT, by means of:
- a shoulder provided on the second end portion 82 and on which the hub 30 abuts; and
- a nut 821 screwed onto an inner end of the rear transverse shaft 80 and abutting against the hub 30.

It is conceivable to provide a casing 94, shown in FIGS. 1, 2, 5 and 6 and not illustrated in FIGS. 7 to 9, where this casing 94 is fastened to the rear structure 10 and comprises:
- a circular-shaped rear portion which envelops the gear ring 90 over its entire circumference, and
- a front portion which prolongs the rear portion and which envelops the gear pinion 91 up to the plate 13.

The remainder of the description relates to the folding of the scooter 1.

Indeed, in the example illustrated in the Figures, the first portion 21 and the second portion 22 of the frame are connected to each other by a swivel joint 7 about a folding axis AP which enables a folding and an unfolding of the scooter 1 about to this folding axis AP, this scooter 1 then forming a foldable scooter. In a non-illustrated variant, the scooter 1 is not foldable, in other words this swivel joint 7 is absent.

Thus, the pivoting of the second portion 22 with respect to the first portion 21 translates in a tilting (or a pivoting) of the steering column 4 for a folding/unfolding of the scooter 1.

Hence, the swivel joint 7 enables a relative mobility between the two portions 21, 22 of the frame 2 between:
- an unfolded configuration, shown in FIGS. 1 to 4, in which the steering column 4 projects upwardly with respect to the footboard 20 for use when moving, steering column 4 then extending in the midplane PM; and
- a folded configuration, shown in FIGS. 5 and 6, in which the steering column 4 is folded down on the left side, along the footboard 20.

The first portion 21 has two successive tubular sections:
- a central section 210 on which the footboard 20 is fastened; and
- a bent section 211 which prolongs the central section 210 and which forms an elbow oriented upwards, with an elbow angle IC (shown in FIG. 2) comprised between 90 and 120 degrees, and in particular comprised between 100 and 110 degrees.

The central section 210 extends along the longitudinal axis AL of the scooter 1. Moreover, the bent section 211 has an upper end (which forms the upper end of the first portion 21) on which the swivel joint 7 is mounted.

This upper end extends linearly along a secondary axis AS which is inclined with respect to the longitudinal axis AL by a secondary angle IS (shown in FIG. 2), with the following relationship: IS=180−IC. Thus, this secondary angle IS is comprised between 60 and 90 degrees, and in particular between 70 and 80 degrees.

In turn, the second portion 22 has:
- a front section 220, tubular and with a curved shape, which prolongs the bent section 211 of the first portion 21; and
- a steering tube 221, secured to an upper end of the front section 220, and inside which the steering column 4 is pivotally mounted.

In the unfolded configuration, the steering tube 221 extends along a steering axis AD which is vertical or inclined rearwardly with respect to the vertical by a steering angle ID (shown in FIG. 2) comprised between 0 and 20 degrees, and thus the steering column 4 pivots about this steering axis AD. The steering column 4 is thus in a pivot connection in the steering tube 221.

The steering column 4 has a lower end 40, below the steering tube 221, which is secured to an arm 41 (or alternatively to a fork); such an arm 41 (or alternatively such a fork) carrying a front transverse shaft 42 on which the front wheel 5 is pivotally mounted.

The steering column 4 has an upper end 43 secured to a handlebar 44 provided with two grips 45.

A telescopic system 46 may also be provided on the steering column 4, above the steering tube 221, enabling a height adjustment of the steering column 4, and more specifically of the handlebar 44.

It should be noted that the front section 220 of the second portion 22 of the frame 2 has a lower end (which forms the lower end of the second portion 22 and which is opposite to the steering tube 221) on which the swivel joint 7 is mounted. This lower end extends linearly along the secondary axis AS in the unfolded configuration. In other words, in the unfolded configuration, the upper end of the first portion 21 of the frame 2 and the lower end of the second portion 22 of the frame 2 are in alignment along this secondary axis AS.

More specifically, the scooter 1 may be configured between:
- the unfolded configuration in which the steering tube 221 and the steering column 4 extend along the steering axis AD which is substantially vertical, or at least which is vertical or inclined with respect to the vertical by an angle comprised between 0 and 20 degrees;
- the folded configuration in which the steering tube 221 and the steering column 4 extend along the steering axis AD which has tilted so as to be substantially horizontal, or at least which is horizontal or inclined with respect to the horizontal by an angle comprised between 0 and 20 degrees.

Advantageously, in the folded configuration, the steering axis AD is parallel (within more or less five degrees) to the longitudinal axis AL, so that the steering column 4 extends parallel to this longitudinal axis AL.

Although not illustrated, it is advantageous to provide a means for blocking the scooter 1 in the folded configuration, in order to prevent it from unfolding inadvertently especially when it is transported manually or when it is placed on the ground.

Regarding the swivel joint 7, this is in the form of a hinge provided with a first hinge knuckle 71 secured to the upper end of the first portion 21 and with a second hinge knuckle 72 secured to the lower end of the second portion 22, where the first hinge knuckle 71 and the second hinge knuckle 72 are articulated with respect to each other by means of a pivot 73 (that is to say a physical axis) defining the folding axis AP.

Thus, this swivel joint 7 is pivotably movable between:
- a closed position corresponding to the unfolded configuration of the scooter 1, in which the upper end of the first portion 21 and the lower end of the second portion 22 are in alignment along the secondary axis As; and an open position corresponding to the folded configuration of the scooter 1, in which the upper end of the first portion 21 and the lower end of the second portion 22 are misaligned and are separated from each other following the pivoting around the folding axis AP.

It should be noted that the first hinge knuckle 71 comprises a first clamping jaw clasping the upper end of the first portion 21, and the second hinge knuckle 72 comprises a second clamping jaw clasping the lower end of the second portion 22. These clamping jaws may be formed of split clamping rings and equipped with one or several clamping screw(s) which allow the rings to be tightened around such tubular ends.

As shown in FIGS. 5 and 6, the swivel joint 7 is arranged for mobility of the steering column 4 from the unfolded configuration to the folded configuration in which the steering column 4 is folded down on the first lateral side (as a reminder the left side in the Figures) with respect to the midplane PM and extends away from this midplane PM (in other words out of the midplane PM), at least partially below the footboard 20, along a first lateral rim 201 of the footboard 20 located on the first lateral side and facing the first lateral face 31 of the rear wheel 3; said footboard 20 having a second lateral rim 202 located on the second lateral side, and therefore opposite to the first lateral rim 201 with respect to the midplane PM, this second lateral rim 202 being clear and free in the folded configuration.

To this end, the folding axis AP is offset on the first lateral side with respect to the midplane PM, and it extends, on the one hand, parallel to the midplane PM and, on the other hand, in an inclined manner with respect to the longitudinal axis AL at an inclination angle IP (shown in FIG. 2), comprised between 20 and 60 degrees, and in particular comprised between 30 and 50 degrees.

Thus, this swivel joint 7 makes it possible to fold the scooter 1, passing from the unfolded configuration to the folded configuration, in a single movement, namely a rotational movement of the steering column 4 about the folding axis AP defined by the swivel joint 7.

Provision is also made for the swivel joint 7 to incorporate a locking mechanism 74 adapted to lock the swivel joint 7 in the closed position, where this locking mechanism 74 may be manipulated manually in order to be able to open and close the swivel joint 7 during folding and unfolding operations.

The invention claimed is:

1. A scooter comprising: a frame provided with a footboard and supporting a rear wheel, a steering column equipped with a front wheel and pivotally mounted on said frame, and a motor equipped with a motor shaft driven in rotation about a motor axis and coupled to the rear wheel to drive it in rotation according to a transverse axis via a transmission system, said scooter having a midplane orthogonal to the transverse axis and delimiting opposite first and second lateral sides, and the rear wheel having a first lateral face on said first lateral side and a second lateral face, opposite to the first lateral face, on said second lateral side, wherein the transmission system comprises:

a rear transverse shaft extending along the transverse axis, not parallel to the motor axis, and having two opposite end portions, respectively a first end portion and a second end portion, the rear wheel being coupled in rotation to the second end portion of the rear transverse shaft;

a gear system comprising a gear ring meshing with a gear pinion, said gear ring being coupled in rotation to the first end portion of the rear transverse shaft, and said gear pinion being coupled in rotation to the motor shaft, such that a rotation of the motor shaft is convertible by said gear system into a rotation of the rear transverse shaft and the rear wheel about the transverse axis; and a rear structure fastened to the frame and supporting at least the gear pinion and the first end portion of the rear transverse shaft, said rear structure extending laterally on the second lateral side with respect to the midplane, facing the second lateral face of the rear wheel, such that the second end portion of the rear transverse shaft protrudes from the rear structure to support in a cantilever fashion the rear wheel; wherein the rear structure comprises two flanges, respectively an inner flange and an outer flange, extending facing each other and spaced apart from each other, the inner flange extending at least partly opposite the second lateral face of the rear wheel, said flanges surrounding the gear pinion and the gear ring, and wherein the first end portion of the rear transverse shaft passes through rear orifices formed facing each other in the respective flanges.

2. The scooter according to claim 1, wherein the rear orifices of the flanges support rolling bearings in which is rotatably mounted the first end portion of the rear transverse shaft.

3. The scooter according to claim 1, wherein the rear structure comprises a plate provided with a front orifice through which passes a pinion shaft secured to the gear pinion.

4. The scooter according to claim 3, wherein the front orifice of the plate supports at least one rolling bearing in which the pinion shaft is rotatably mounted.

5. The scooter according to claim 3, wherein the plate extends between the two flanges.

6. The scooter according to claim 1, wherein the gear pinion is coupled to the motor shaft via an elastomeric coupling, a constant velocity joint, a transmission joint, or a universal joint, or alternatively via a preliminary gear system.

7. The scooter according to claim 1, wherein the motor axis is orthogonal to the transverse axis or is inclined with respect to the transverse axis by an angle comprised between 45 and 90 degrees.

8. The scooter according to claim 1, wherein the motor axis is parallel to a longitudinal axis of the scooter, such a longitudinal axis being included in the midplane and passing through the front wheel and through the rear wheel while being parallel to an advance direction of the scooter when the latter moves forward in a straight line, or is inclined with respect to the longitudinal axis by an angle between 0 and 45 degrees.

9. The scooter according to claim 1, wherein the rear wheel is provided with a hub coupled in rotation to the second end portion of the rear transverse shaft, by at least one key, a flanged coupling, a pin coupling, a yoke coupling, or a ring coupling.

10. The scooter according to claim 1, wherein the gear system forms a bevel gear with helical or spur toothing.

11. The scooter according to claim 1, wherein the gear system has a transmission ratio between the motor shaft at the input and the rear transverse shaft at the output which is comprised between 1:2 and 1:5.

12. The scooter according to claim 1, wherein the rear structure is fastened to a connecting plate secured to the frame, said connecting plate supporting the motor and having two opposite faces, respectively a front face from which protrudes the motor and a rear face from which protrudes the rear structure.

13. The scooter according to claim 1, wherein the motor extends behind the footboard and partially below the footboard.

14. The scooter according to claim 13, wherein the footboard has a rear step, above grade, for an arrangement of the motor partially below the rear step.

15. The scooter according to claim 1, wherein the scooter is foldable with the frame comprising, on the one hand, a first portion supporting the rear wheel and the footboard and, on the other hand, a second portion pivotally supporting the steering column, wherein the first portion and the second portion of the frame are connected to each other by a swivel joint along a folding axis allowing mobility of one relative to the other between:
- an unfolded configuration in which the steering column projects upwardly with respect to the footboard for use when moving, said steering column extending in the midplane; and
- a folded configuration in which the steering column is folded down onto the first lateral side with respect to the midplane and extends at a distance from said midplane, at least partially below of the footboard, along a first lateral rim of the footboard located on said first lateral side and facing the first lateral face of the rear wheel.

\* \* \* \* \*